Sept. 1, 1964      O. E. CURTH      3,146,789

PRESSURE SHUT-OFF ASSEMBLY

Filed July 26, 1962      4 Sheets-Sheet 1

INVENTOR.
OTTO E. CURTH
BY
James W. DeSimone
Att'ys.

Sept. 1, 1964  O. E. CURTH  3,146,789
PRESSURE SHUT-OFF ASSEMBLY
Filed July 26, 1962  4 Sheets-Sheet 2

INVENTOR.
OTTO E. CURTH
BY
James W. DeSimone
ATTY'S.

Sept. 1, 1964     O. E. CURTH     3,146,789
PRESSURE SHUT-OFF ASSEMBLY
Filed July 26, 1962     4 Sheets-Sheet 3

INVENTOR.
OTTO E. CURTH

Sept. 1, 1964  O. E. CURTH  3,146,789
PRESSURE SHUT-OFF ASSEMBLY
Filed July 26, 1962  4 Sheets-Sheet 4
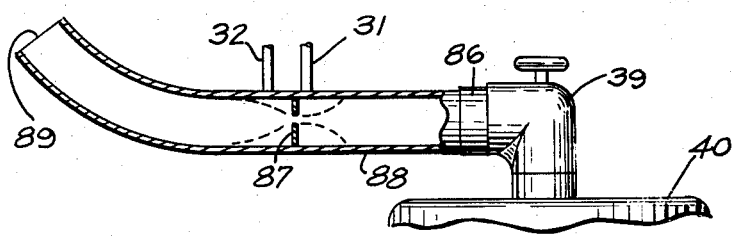
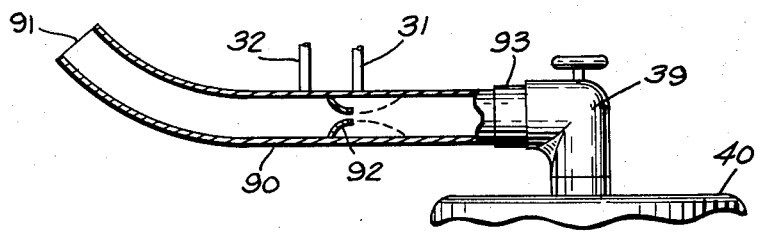
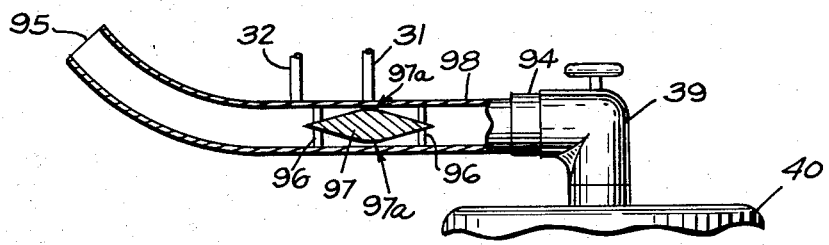
INVENTOR.
OTTO E. CURTH
BY
James W. DeSimone

United States Patent Office 3,146,789
Patented Sept. 1, 1964

3,146,789
PRESSURE SHUT-OFF ASSEMBLY
Otto E. Curth, Park Forest, Ill., assignor to IIT Research Institute, a corporation of Illinois
Filed July 26, 1962, Ser. No. 212,610
8 Claims. (Cl. 137—461)

This invention relates to presure shut-off systems, and more particularly to a pressure shut-off system for non-vented collapsible containers.

The use of single opening non-vented collapsible containers for bulk fuel handling has created a need for a system which would insure safe operation duirng the fueling and defueling processes. In patricular, a system was needed to accurately and reliably stop the filling process when the container pressure reached a predetermined value.

Bulk fuel handling eliminates much of the handling time required with individual rigid containers, and has led to the introduction of collapsible containers as a means of storing and carrying fluids. One of the features of such collapsible container is the fact that once it is filled, it is sealed and thus there is no spillage or loss of vapor. Unforunately, however, being sealed, the internal container pressure does not remain constant after filling. Changes in the ambient pressure and temperature are reflected as changes in the differential gauge pressure between the container contents and the container's surroundings. These changes will occur if the container is stored in bright sunlight where radiant energy is converted into sensible heat. This heat raises the temperature and vapor pressure of the stored fluid. Fuprthermore, if the container is elevated to high altitude as in air transport, the gauge pressure increases. These phenomena led to this invention as a means for establishing a reasonable margin of safety for an internal pressure in such collapsible containers. This reasonable margin of safety is established by defining a maximum pressure to which the containers are to be filled under average atmospheric conditions.

Accordingly, it is the general object of this invention to provide a system to protect collapsible containers from over-filling and possible rupture by stopping the flow at a predetermined container pressure.

Another object of this invention is to provide an in line pressure shut-off system operated by the flowing fluid for non-vented collapsible containers which is as failsafe as possible.

Another more specific object of this invention is to provide a pressure shut-off system for collapsible containers where means are provided for sensing the internal container pressure exteriorly of the container.

Yet another object of this invention is to provide a compact pressure shut-off system for collapsible containers wherein the sensing means for sensing container pressure at a point outside of the container incudes a venturi tube.

Still another object of this invention is to provide a compact pressure shut-off system for collapsible containers wherein the sensing means for sensing container pressure at a point outside of the container includes an orifice plate.

A further object of this invention is to provide a compact pressure shut-off system for collapsible containers wherein the sensing means for sensing container pressure at a point outside of the container includes a nozzle as a pressure depressant.

A still further object of this invention is to provide a compact pressure shut-off system for collapsible containers wherein the sensing means for sensing container pressure at a point outside of the container includes an inverted venturi.

The foregoing and other objects of the invention will become more apparent from the following description, appended claims and drawings in which:

FIGURE 7 is an illustration of an alternative embodiment;

FIGURE 8 is an illustration of another alternative embodiment; and

FIGURE 9 is an illustration of yet another alternative embodiment.

The preferred system is based on the utilization of a venturi tube, and its inherent characteristics, to sense the container pressure at a point outside the container. That is to say, a venturi tube is used in the filling line to develop a pressure equal to the container pressure at a point outside the container. The venturi tube is designed so that the pressure at the throat equals the container pressure regardless of flow rate. The gain in pressure in the venturi discharge section equals the loss of pressure in the fitting connected from the venturi to the container interior. The pressure recovered between the throat and the exit end of the venturi tube equals the pressure loss in the fitting if the hydraulic characteristics of the venturi and the fitting are properly matched. Under these conditions the pressure at the venturi throat always equals container pressure regardless of the flow rate.

The fitting valve must be fully open when using this system for an accurate container pressure measurement. However, if the fiting valve is not fully open, the pressure drop across the fitting will be higher resulting in a higher pressure at the venturi throat. This will tend to stop the filling at a lower container pressure than desired. In other words, failure to fully open the valve will cause this system to malfunction to fill the container intermittently. In case of operator negligence, then the system will fail safe.

The remaining portion of the system senses the venturi throat pressure and, at a pre-set pressure, operates a diaphragm valve in the filling line to interrupt fluid flow. A pilot valve senses this venturi throat pressure and at such pre-set pressure operates to close the diaphragm valve to stop further filling of the container.

Figure 1A:
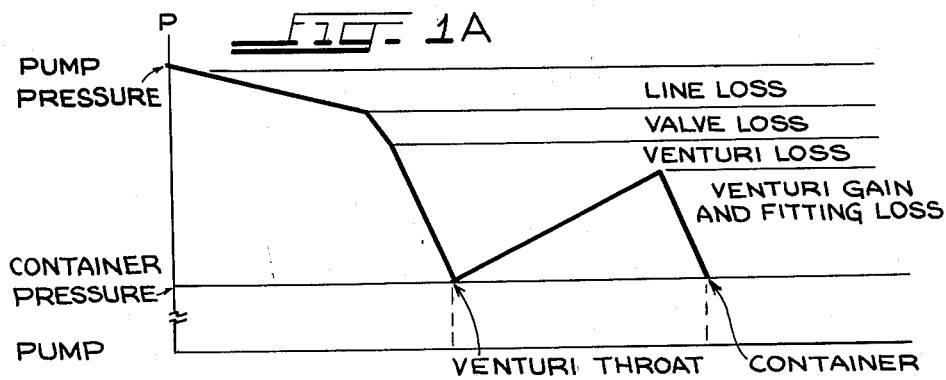
FIGURE 1 is an illustration of a completely assembled pressure shut-off assembly in accordance with the teachings of this invention.
Figure 1:
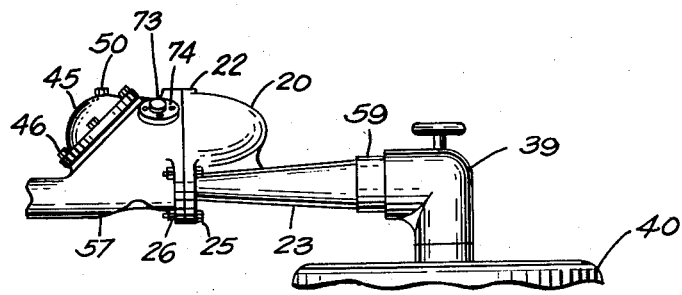

Referring now to FIGURES 1 and 1a, a complete assembly is shown and the pressure variations along the assembly are illustrated. Inlet valve body 57 is connected to pump 36 (see FIGURE 2) which is connected to coupling 37 to supply container 38. With the system in operation, pump 36 forces fluid through valve body 57, through valve body outlet 23, connected to valve fitting 39 and then into container 40.

In FIGURE 1a, the pressure variations along the path of the system are illustrated. It will be noted that the pressure at the venturi throat 27 and of container 40 are identical regardless of flow rate because of the proper matching of the hydraulic characteristics of the venturi and fitting 39. That is to say, the pressure gain beyond the throat 27 of the venturi is equal to the loss through fitting 39 into container 40. It is by utilizing this unique property of equal pressures at different points along the filling line that the system is able to, externally of container 40, measure pressure and control the filling of container 40 thereby.

Figure 2:
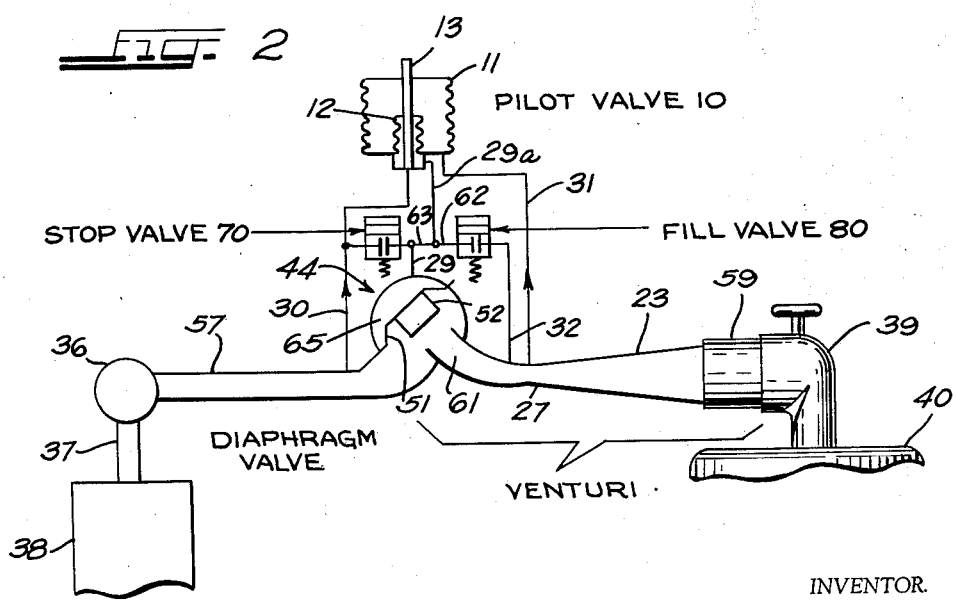
FIGURE 2 is a schematic diagram useful for describing the principles of a preferred embodiment of this invention.
Figure 3:
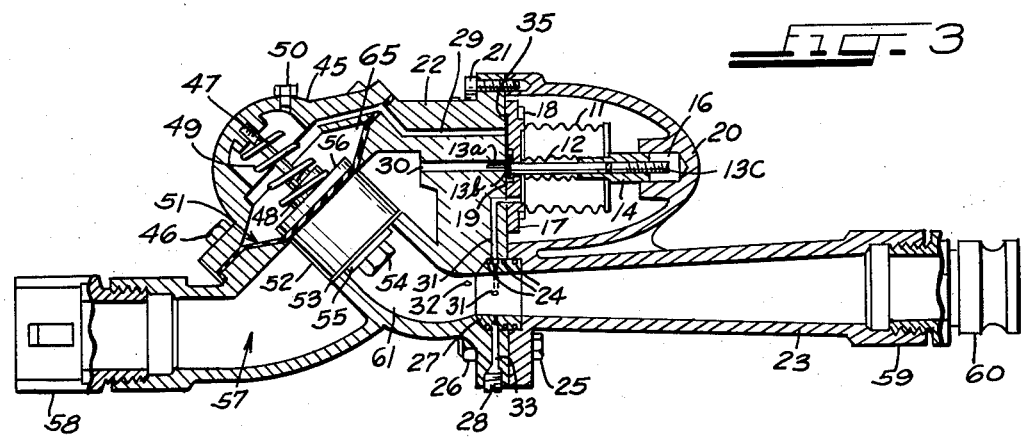
FIGURE 3 is a side view, partly in section, of the preferred embodiment.
Figure 4:
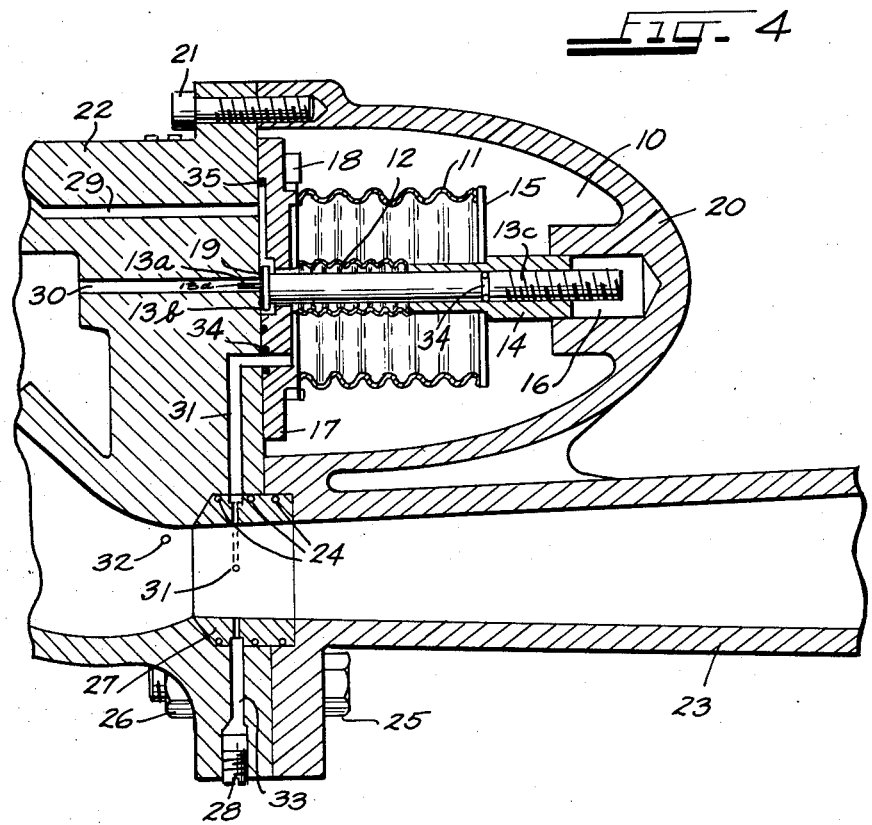
FIGURE 4 is an enlarged view of a portion of FIGURE 3 depicting the pilot valve assembly and the venturi tube throat.

Turning now to FIGURES 2, 3 and 4, it will be seen that when the diaphragm valve is open the fluid will pass into venturi inlet chamber 61, venturi throat 27, valve body outlet 23, valve fitting 39, and then into container 40. The pressure at venturi throat 27 corresponding to container 40 inlet pressure, is coupled to pilot valve 10 by means of port 31. The container pressure or venturi throat 27 pressure is applied between bellows 11 and 12. When the pressure between bellows 11 and 12 is sufficient to overcome a pre-set bellows tension, valve stem 13 connected to bellows end plate 15 rises allowing fluid flow to pass from valve inlet body 57 via port 30 into an inner chamber (defined by base plate 17) through port 29a, port 29 and into chamber 65 on back side of diaphragm valve 44. Because of the relatively low pressures which may occur in filling collapsible containers, and the resulting low forces which are thereby developed in the system, sliding friction between valve stem 13 and its supporting structure is minimized by using bellows 12 as a seal. As the fluid flows into chamber 65 its pressure forces diaphragm valve 44 down causing it to seat onto venturi inlet chamber 61 to stop further fluid flow.

Figure 5:
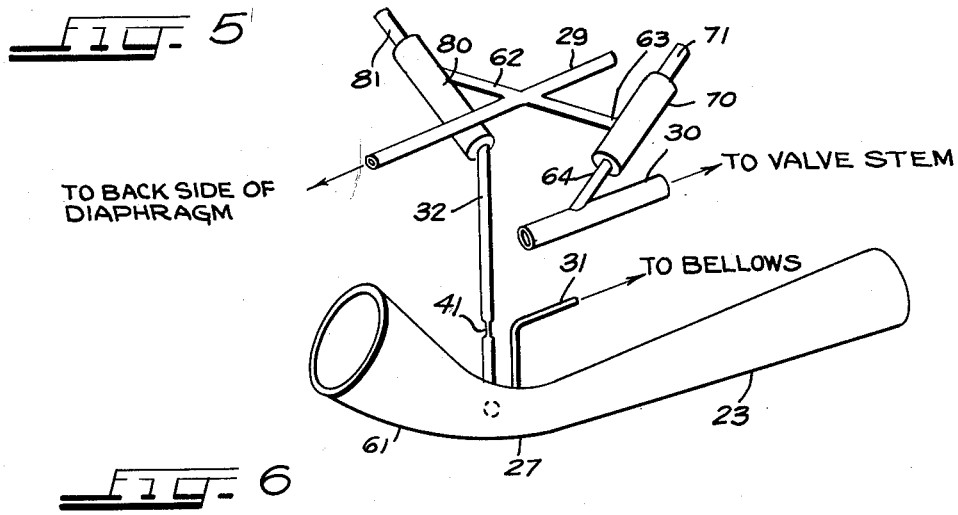
FIGURE 5 is a schematic perspective of the porting between the various elements of the system.

Referring to FIGURES 2, 3, and 5, as valve stem 13 is rising, the fluid coupling the inlet fluid pressure into the inner bellows chamber acts upon the area at the end of bellows 12 forcing it to expand and aid in the opening of the pilot valve 10. At the same time, the fluid pressure is operating to close diaphragm valve 44.

After chamber 65 is filled with fluid and diaphragm valve 44 is completely closed, the container pressure coupled through port 31 into bellows 11 maintains pilot valve 10 in an open position. In order to fill the next container, recycling fill valve 80 and its associated porting is provided. When valve 80 is actuated it opens the line between port 62, which is coupled to the chamber of bellows 12, and chamber 65 into the low pressure side of diaphragm valve 44 as illustrated. In this way, the pressure in chamber 65 acting upon valve 44 is relieved and the fluid is permitted to pass out of chamber 65. While recycling, the fluid in inlet valve body 57 acts upon the other side of diaphragm valve 44 forcing it into the open position to permit fluid pass through the assembly and into another empty container. Restriction 41 in port 32 is provided to insure against operator negligence. More specifically, this restriction acts as a fixed resistance to the flow through port 32 (when fill button 81 is depressed) will not allow diaphragm valve 44 to open when stop valve 70 or pilot valve 10 is open. In this way, container 40 cannot be overfilled. Although some flow will take place it is only that small amount passing through valve 80.

Stop valve 70 is provided in the event that it is desired to stop the system prior to attainment of the predetermined filling pressure. Stop valve 70 is identical in structure to recycling fill valve 80. Upon opening valve 70 fluid is coupled through port 30 (from the inlet side of the system) through port 64, port 63, port 29 and then into chamber 65 to act upon diaphragm valve 44 forcing it to close. When valve 70 is open, it also couples fluid pressure through port 63 and port 29a into the chamber between bellows 12 and bellows 11.

In FIGURES 3 and 4, there is respectively shown a cutaway of the pressure shut-off system and an enlarged view of pilot valve 10 including associating venturi throat 27. Pilot valve 10 consists of primarily large bellows 11, small bellows 12 and valve stem 13. Valve stem 13 has a pin 13a provided to insure proper seating within port 30. Pin 13a is provided with slots 13d so that fluid may begin to flow when stem 13 raises from port 30.

In this way, upon actuation of stem 13, the system consistently operates at the same container pressure. Stem 13 also contains screw portion 13c cooperable with sleeve 14 to adjust bellows tension to correspond to a predetermined activation pressure. By the operation of screw portion 13c, a preset extension may be applied to bellows 11 and 12. The pre-set extension must then be overcome by the fluid pressure coupled from venturi throat 27. End plate 15 is mechanically linked to sleeve 14 and stem 13 so that when pressure applied interiorly of bellows 11 causes it to expand, it will force stem 13 to the right in the figures. Recess 16 is provided in pilot valve cover 20 to support and permit linear movement of stem 13 and adjustment screw 13c.

Bellows 11 and bellows 12 are secured to base plate 17 in fluid tight relation. Base plate 17 in turn is secured to valve body member 22 by means of base plate screws 18. Ordinarily, three screws will sufficiently secure base plate 17 to member 22. In this particular design, unsymmetrical location of the three screws provides proper positioning of pilot valve 10 in relation to the porting.

In order to insure proper sealing between valve stem 13b and member 22, sealing means 19 around pin 13a is provided. Additionally, O rings 34 and 35 are provided where indicated to insure against leakage.

Member 27 defines the throat area of the venturi tube and has port 31 terminating therein. The other end of port 31 passes into an opening of like diameter in base plate 17 permitting fluid flow into the chamber between bellows 11 and bellows 12. In this way, there is fluid coupling from venturi throat 27 into pilot valve 10 and if the pressure exceeds a predetermined value corresponding to the bellows tension set by screw 13c, the fluid will force valve stem 13 to the right such that it is unseated. When valve stem 13 is unseated it permits fluid to flow from the inlet side into the opening at the bottom of pilot valve base plate 17 and from there through port 29 into chamber 65 on the back side of diaphragm valve 44. It will be noted that when valve stem 13 moves to the right, the fluid passing in through port 30 will also pass into the interior of bellows 12. In order to accomplish this, a small clearance between the valve stem 13 and the passage through base plate 17 is provided. The fluid passing inside bellows 12 causes it to expand and such expansion aids bellows 11 in forcing valve stem 13 to the right and in keeping it in that position. It will be noted that the ring 13b on valve stem 13 limits the extent of bellows expansion by abutment with base plate 17 when pilot valve 10 is in the open position. In this way, the bellows are not overstretched so that they will always return to the same position at substantially the same tension.

The fluid passing from the source into port 30, port 29 and ultimately into chamber 65 exerts pressure on diaphragm 51 sufficient to force the vale to close and seat across the opening into the inlet side 61 of the venturi.

As previously described, the container pressure is applied to the chamber between bellows 11 and bellows 12. When this pressure is sufficient to overcome the pre-set bellows tension, valve stem 13 connected to bellows end plate 15 rises allowing flow to occur from inlet valve body 57 through port 30, port 29 and then to chamber 65 above the diaphragm valve 44 thus stopping the flow.

Diaphragm valve 44 consists of guide shaft 47, washer 56, diaphragm 51, poppet 52, resilient disc 53, washer 55, bolt 54, nut 48 and spring 49. It is noted that bolt 54 and nut 48 secure the diaphragm to the poppet. Furthermore, as is illustrated, washer 55 is just large enough to pass into inlet side 61 of the venturi so that resilient disc 53 may properly seat on the end walls of the venturi to assure a proper sealing. A suitable material for disc 53 is "90 Duro Buna N" which is available from Superior Rubber Supply Corporation, Chicago, Illinois. Spring 49 is provided to overcome the weight of poppet 52 to prevent the valve from opening if, for example, the assembly were inverted.

Valve cover plate 45 is secured to body member 22 by means of bolts 46. A brass plug 50 is used to provide an opening into chamber 65 in the event that bleeding of chamber 65 is required. In this respect, it will be noted that air in chamber 65 tends to slow down operation of valve 44, but it will not prevent it from operating.

Port 33, normally sealed by plug 28, is provided to permit access to throat 27 of the venturi if the operator desires to check the pressure with a meter at this point.

In order to recycle the system to fill another container, recycling valve 80 is actuated. When this valve is actuated, it permits the fluid in chamber 65 to flow back through port 29, port 62, valve 80, port 32 and into the inlet side 61 of the venturi close to venturi throat 27.

As poppet 52 of diaphragm valve 44 is rising, the inlet pressure acts upon the area at the end of valve stem 13 exposed to port 30. In one particular example, the preset pressure for cut-off was determined to be 5 p.s.i.g. The net bellows area over which the container pressure acted was 2.07 square inches. Accordingly, the force developed at this pressure to actuate pilot valve 10 is 10.35 pounds. If the same force were developed at the exposed effective area of valve stem 13 in port 30, valve stem 13 would move to the right and pilot valve 10 would open. The effective exposed area of valve stem 13 was 0.0229 square inch. Accordingly, the pressure required to activate pilot valve 10 in this manner is equal to the force divided by the area or 10.35/.0229, or 346 p.s.i. The pilot valve, then, was capable of operation at line pressures up to 346 p.s.i. without affecting the desired operation of the system.

As can be seen from FIGURE 3, any pressure in chamber 65 acting on diaphragm 51 is also acting interiorly of bellows 12 and tends to maintain pilot valve 10 in the open position. This effect can be determined in accordance with the following notation and analysis.

$A_s$ = active area of bellows 12, inches squared
$A_1$ = active area of bellows 11, inches squared
$A_v$ = active area of pilot valve 13b, inches squared
$dA = A_1 - A_s$, area acted upon by $P_v$, inches squared
$S$ = bellows stretch
$P_d$ = pressure applied to diaphragm 51, p.s.i.g.
$P_1$ = line pressure from source, of valve body inlet side 57, p.s.i.g.
$P_v$ = pressure from venturi throat 27, p.s.i.g.
$K_1$ = spring constant of bellows 11, lb./in.
$K_s$ = spring constant of bellows 12, lb./in.
$K_p$ = spring constant of bellows 11 and bellows 12, lb./in., $K_s + K_1$ In use, pressure $P_d$ is reduced to near atmospheric by means of valve 80. $P_v$ the venturi pressure, remains near atmospheric until slack is removed from the container and container pressure increases. When the force developed by $P_v$ acting on area $dA$ exceeds the force developed by the stressed bellows (setting of the shut-off pressure point with screw 13c) pilot valve 10 opens. As pilot valve 10 opens, line pressure $P_1$ acts on area $A_s$ aiding in opening pilot valve 10. Before pilot valve 10 opens, the line pressure $P_1$ is acting on seat area $A_v$ acting to try to open pilot valve 10.

A force balance for this may be written as follows:

$$K_p S = P_1 A_v + P_v dA$$

$$\frac{\text{lb.}}{\text{in.}} \times \text{in.} = \frac{\text{lb.}}{\text{in.}^2} \times \text{in.}^2 + \frac{\text{lb.}}{\text{in.}^2} \times \text{in.}^2 + \frac{\text{lb.}}{\text{in.}^2} \times \text{in.}^2 = \text{lb. force}$$

Since pilot valve 10 should only operate at specific values of $P_v$ the force generated by pressures acting upon areas $A_v$ and $A_s$ must be minimized. $A_v$ must be kept small but large enough to pass enough flow to close diaphragm valve 44 in a reasonable time. As the pilot valve 10 opens and diaphragm valve 44 closes, line pressure is applied to $A_s$. When the pressure shut-off assembly is disconnected from a filled container and connected to any empty container, $P_v$ is close to zero but $P_1$ is still acting upon area $A_s$. If $A_s P_1$ is greater than $K_p S$ the pilot valve 10 will not close and diaphragm valve 44 cannot be opened by operating recycling fill valve 80. When this occurs the line pressure $P_1$ must be momentarily reduced (not necessarily to zero) to allow pilot valve 10 to close. Once it is closed full line pressure may be applied and the system will cycle once. Pilot valve 10 should have a large $dA$ and a small $A_s$ to minimize this phenomena and operate at high line pressures; for as mentioned above, the valve will not close when $$P_1 A_s = K_p S = P_v dA$$

$$\frac{P_1}{P_v} = \frac{dA}{A_s}$$

for a cut-off pressure $P_v$ of 5 p.s.i.g. in a line pressure $P_1$ of 120 p.s.i.g. the area ratio must be 120/5=24 in presently used systems an area ratio of 12.2 has been used resulting in a maximum operating line pressure of 61 p.s.i.g. for continuous operation, without reducing line pressure to allow pilot valve 10 to close. Preferably, the inner bellows 12 should be reduced in diameter sufficiently to increase the area ratio to 24 or more thus allowing use of the system with line pressures of at least 120 p.s.i.g.

The foregoing analysis was applied to one particular embodiment of this invention. However, this analysis may be applied to other embodiments equally as well, the objective being to provide a large area ratio with bellows 12 kept as small as possible.

Figure 6:
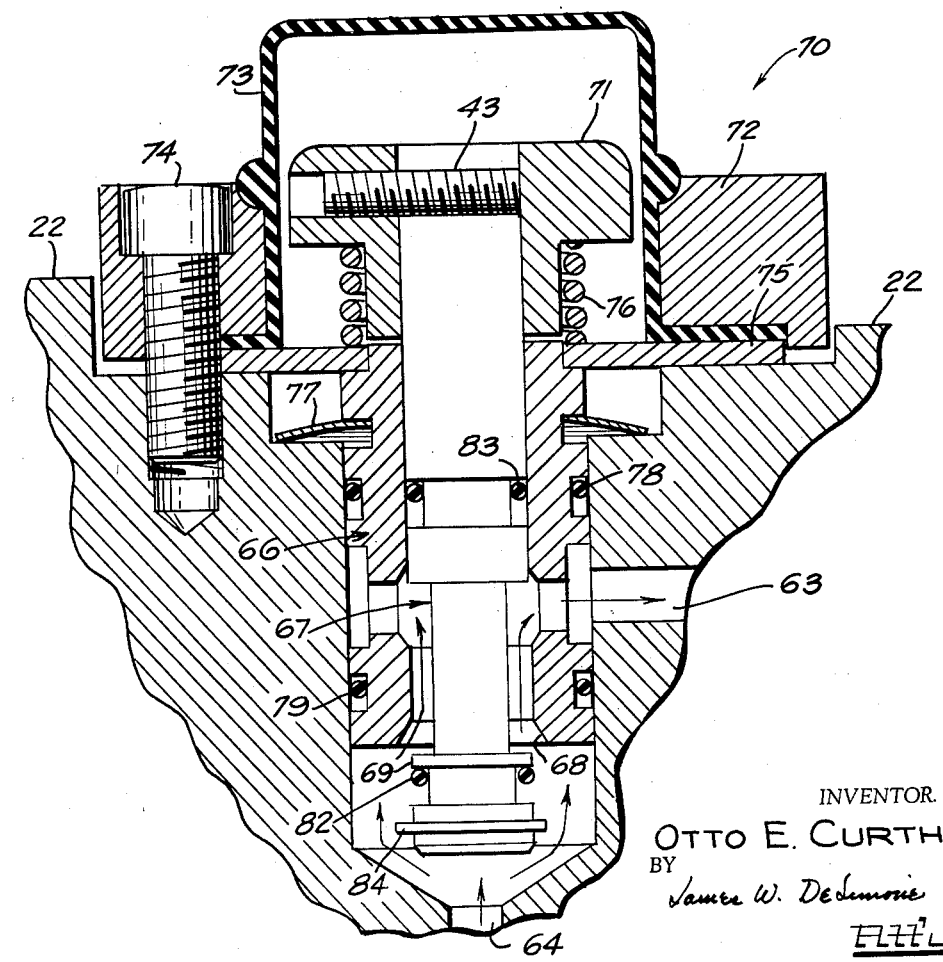
FIGURE 6 is a schematic, sectional, diagram of a valve used in recycling the system.

In FIGURE 6 is shown recycling stop valve 70. Fill valve 80 is of identical structure except that the direction of fluid flow is reversed from that illustrated in FIGURE 6.

In FIGURE 6, valve 70 is shown in the depressed, open position which permits fluid to pass through the valve in the direction indicated by the arrows. Push button 71 is maintained in the upright position by means of spring 76. Additionally, valve body 66 defines the lower limit to which button 71 may be depressed. Valve stem 67 is journalled into the central portion of button 71 and secured thereto by means of screw 43. The lower portion of valve stem 67 is journalled within valve body 66 in sliding engagement therewith. The fluid passes into the valve through port 64 at the bottom thereof and up into the central portion of the valve in the passage defined by valve body 66 thence into port 63 and ultimately to the back side of diaphragm valve 44. O rings 83, 78, 79 and 82 are provided to insure against leakage. Beryllium-copper E ring is provided near the base of valve stem 67 to seat within valve body 66 at the tapered portion 68. In this way, the upper extent of valve stem 67 is limited when button 71 is released. Tapered portion 68 of valve body 66 and flanged portion 69 of stem 67 cooperate to guide the movement of stem 67 and O ring 82 into valve body 66. A flexible rubber cover 73 encircles push button 71 and is secured to valve body 22 by means of ring plate 72 and screws 74. Additionally, washer 75 is provided to properly seat spring 76 and valve body 66 within the housing of valve body 22. By means of the spring action of ring 77 the valve body 66 is kept in place against washer 75.

As was noted before, there is no structural difference between fill valve 80 and stop valve 70 illustrated in FIGURE 6. However, there is a difference in the direction of fluid flow. More particularly, in fill valve 80 the fluid flows into the side thereof via port 62 and out of the bottom of the valve via port 32.

FIGURES 7, 8 and 9 depict alternative pressure depressant means which may be substituted for the venturi tube of the preferred embodiment. Like reference numerals denote like parts common to the system.

In FIGURE 7, an orifice plate type pressure depressant means is illustrated. Constant diameter pipe 88 may be used in this embodiment. A disc 87 having a narrow opening therethrough is secured to the interior wall of pipe 88 and interposed in the flow stream. The operation of the narrow opening in disc 87 is somewhat similar to the venturi in that the fluid flow takes the form illustrated by the dotted lines. It is at the narrowest portion of the dotted lines that port means 31 is connected. This narrowest portion is the low pressure point in pipe 88. Pipe 88 may be secured to fitting 39 by means of coupling 86. Fitting 39, in turn, connects the system to container 40. Diaphragm valve 44 seats across opening 89 of pipe 88.

In FIGURE 8, a nozzle 92 is inserted in the flow stream by attachment within uniform diameter pipe 90 and acts as the pressure depressant means. As in the previous figure, the low pressure point in the flow stream is illustrated by the dotted lines. It is at this low pressure point that port 31 is connected. Coupling 93 serves to secure pipe 90 to fitting 39 and container 40. Diaphragm valve 44 seats across opening 91 of pipe 90. Nozzle 92 is secured to the interior wall of pipe 92 by conventional methods, such as for example, by seam welding.

In the embodiments of FIGURES 7 and 8, it is noted that the efficiency of the system is less than that for the system utilizing the conventional venturi. The reason for this is that the pressure gain occurring beyond the low pressure point and up to fitting 39 is less than that obtainable with the venturi tube. Accordingly, it is necessary that initial higher pumping pressures are necessary in order to regain enough pressure beyond the orifice plate 87 (or nozzle 92) to compensate for the fitting pressure loss.

In FIGURE 9, another embodiment of a pressure depressant device is illustrated. This embodiment utilizes the principle of an inverted venturi. More particularly, member 97 is secured within uniform diameter pipe 98 by means of posts 96. The flow stream will reach a minimum pressure at 97a. Port 31 is connected to pipe 98 at this minimum pressure point. Diaphragm valve 44 seats across opening 95 of pipe 98.

The pressure gain beyond 97a to coupling 94 must then equal the pressure loss in fitting 39. It is noted that in this embodiment, the pressure loss caused by the fluid passing over member 97 is greater than that of the conventional venturi. This is due in part to the larger surface area of member 97. Accordingly, as in the embodiments of FIGURES 7 and 8, greater initial pumping pressure is required.

Numerous embodiments have been illustrated and described, however, it is noted that the invention should not be limited thereto but rather by the scope of the following claims. For example, in FIGURE 3 couplings 58–58' and 59–60 are illustrated for attaching the assembly, but other securing means could be employed. Also, while the system has been described with particular reference to collapsible containers, the system may also be used with vented and non-vented rigid containers with equally satisfactory results.

I claim as my invention:

1. In a pressure shut-off system for filling containers wherein such system forms a part of a single line supply, comprising in combination:
   first fluid coupling means adapted for connection to a fluid source under pressure;
   a first chamber connected to the other end of said first coupling means;
   second fluid coupling means including a pressure depressant device in the flow stream for establishing a minimum pressure point in said second coupling means, said second coupling means originating in said first chamber and adapted to terminate in said container;
   diaphragm valve means in said first chamber and in operative relation with said first and second coupling means to stop fluid flow therebetween upon actuation thereof;
   a second chamber separated from said first chamber by said diaphragm valve;
   pilot valve means with a single pressure coupling to said minimum pressure point, and responsive thereto;
   first port means connected to said first coupling means and to said pilot valve;
   second port means connected to said pilot valve and to said second chamber;
   said pilot valve being operative to connect said first port means to said second port means to cause fluid to flow into said second chamber to actuate said diaphragm valve when the pressure at said minimum pressure point reaches a predetermined value wherein the pressure at said minimum pressure point corresponds to the internal pressure of said container regardless of fluid flow rate;
   first cycling valve means with fluid couplings to said first port means and said second port means operative upon actuation thereof to by-pass the pilot valve to permit fluid to flow into said second chamber from said first fluid coupling means to actuate the diaphragm valve; and
   second cycling valve means with fluid couplings to said second port means and to said second fluid coupling means operative upon actuation thereof to permit fluid to flow from said second chamber into said second fluid coupling means to de-actuate the diaphragm valve.

2. In the apparatus of claim 1 wherein said pilot valve includes:
   first and second bellows and a valve stem with said first bellows positioned in said second bellows and said stem passing through both said first and second bellows;
   wherein said first bellows, said second bellows and said stem are secured to each other in mutually coextensive, coaxial relation.

3. In the apparatus of claim 1 wherein said predetermined pressure is adjustable in the pilot valve.

4. In a pressure shut-off system for filling containers wherein such system forms a part of a single line supply, comprising in combination:
   first fluid coupling means adapted for connection to a fluid source under pressure;
   a first chamber connected to the other end of said first coupling means;
   second fluid coupling means originating in said chamber and adapted to terminate in said container, said second fluid coupling means including a conventional venturi tube in the flow stream and a fitting for connection to the container with a pressure gain beyond the throat of the venturi being equal to the fluid pressure loss in the fitting;
   diaphragm valve means in said first chamber and in operative relation with said first and second coupling means to stop fluid flow therebetween upon actuation thereof;
   a second chamber separated from said first chamber by said diaphragm valve;
   pilot valve means with a pressure coupling to the throat of said venturi and responsive thereto;
   first port means connected to said first coupling means and to said pilot valve;
   second port means connected to said pilot valve and to said second chamber;
   said pilot valve being operative to connect said first port means to said second port means to cause fluid to flow into said second chamber to actuate said diaphragm valve when the pressure at the throat of said venturi reaches a predetermined value wherein the pressure at the throat of said venturi corresponds to the internal pressure of said container regardless of fluid flow rate;

first cycling valve means with fluid couplings to said first port means and said second port means operative upon actuation thereof to by-pass the pilot valve to permit fluid to flow into said second chamber from said first fluid coupling to actuate the diaphragm valve; and
second cycling valve means with fluid couplings to said second port means and to said second fluid coupling means operative upon actuation thereof to permit fluid to flow from said second chamber into said second fluid coupling means to de-actuate the diaphragm valve.

5. In the apparatus of claim 4 wherein said pilot valve includes:
   first and second bellows and a valve stem with said first bellows positioned in said second bellows and said stem passing through both said first and second bellows;
   wherein said first bellows, said second bellows and said stem are secured to each other in mutually coextensive, coaxial relation.

6. In a pressure shut-off system for filling containers wherein such system forms a part of a single line supply, comprising in combination:
   first fluid coupling means adapted for connection to a fluid source under pressure;
   a first chamber connected to the other end of said first coupling means;
   second fluid coupling means originating in said first chamber and adapted to terminate in said container, said second fluid coupling means including an orifice plate in the flow stream and a fitting for connection to the container with a pressure gain beyond a minimum pressure point caused by said plate being equal to the fluid pressure loss in the fitting;
   diaphragm valve means in said first chamber and in operative relation with said first and second coupling means to stop fluid flow therebetween upon actuation thereof;
   a second chamber separated from said first chamber by said diaphragm valve;
   pilot valve means with pressure coupling to said minimum pressure point and responsive thereto;
   first port means connected to said first coupling means and to said pilot valve;
   second port means connected to said pilot valve and to said second chamber;
   said pilot valve being operative to connect said first port means to said second port means to cause fluid to flow into said second chamber to actuate said diaphragm valve when the pressure at said minimum pressure point reaches a predetermined value wherein the pressure at said minimum pressure point corresponds to the internal pressure of said container regardless of fluid flow rate;
   first cycling valve means with fluid couplings to said first port means and said second port means operative upon actuation thereof to by-pass the pilot valve to permit fluid to flow into said second chamber from said first fluid coupling means to actuate the diaphragm valve; and
   second cycling valve means with fluid couplings to said second port means and to said second fluid coupling means operative upon actuation thereof to permit fluid to flow from said second chamber into said second fluid coupling means to de-actuate the diaphragm valve.

7. In a pressure shut-off system for filling containers where such system forms a part of a single line supply, comprising in combination:
   first fluid coupling means adapted for connection to a fluid source under pressure;
   a first chamber connected to the other end of said first coupling means;
   second fluid coupling means originating in said first chamber and adapted to terminate in said container, said second fluid coupling means including a nozzle in the flow stream and a fitting for connection to the container with a pressure gain beyond a minimum pressure point caused by said nozzle being equal to the fluid pressure loss in the fitting;
   diaphragm valve means in said first chamber and in operative relation with said first and second coupling means to stop fluid flow therebetween upon actuation thereof;
   a second chamber separated from said first chamber by said diaphragm valve;
   a pilot valve means with a pressure coupling to said minimum pressure point and responsive thereto;
   first port means connected to said first coupling means and to said pilot valve;
   second port means connected to said pilot valve and to said second chamber;
   said pilot valve being operative to connect said first port means to said second port means to cause fluid to flow into said second chamber to actuate said diaphragm valve when the pressure at said minimum pressure point reaches a predetermined value wherein the pressure at said minimum pressure point corresponds to the internal pressure of said container regardless of fluid flow rate;
   first cycling valve means with fluid couplings to said first port means and said second port means operative upon actuation thereof to by-pass the pilot valve to permit fluid to flow into said second chamber from said first fluid coupling means to actuate the diaphragm valve; and
   second cycling valve means with fluid couplings to said second port means and to said second fluid coupling means operative upon actuation thereof to permit fluid to flow from said second chamber into said second fluid coupling means to de-actuate the diaphragm valve.

8. In a pressure shut-off system for filling containers wherein such system forms a part of a single line supply, comprising in combination:
   first fluid coupling means adapted for connection to a fluid source under pressure;
   a first chamber connected to the other end of said first coupling means;
   second fluid coupling means originating in said first chamber and adapted to terminate in said container, said second fluid coupling means including a conventional inverted venturi tube in the flow stream and a fitting for connection to the container with a pressure gain beyond the throat of the inverted venturi being equal to the fluid pressure loss in the fitting;
   diaphragm valve means in said first chamber and in operative relation with said first and second coupling means to stop fluid flow therebetween upon actuation thereof;
   a second chamber separated from said first chamber by said diaphragm valve;
   pilot valve means with a pressure coupling to the throat of said inverted venturi and responsive thereto;
   first port means connected to said first coupling means and to said pilot valve;
   second port means connected to said pilot valve and to said second chamber;
   said pilot valve being operative to connect said first port means to said second port means to cause fluid to flow into said second chamber to actuate said diaphragm valve when the pressure at the throat of said inverted venturi reaches a predetermined value wherein the pressure at the throat of said inverted venturi corresponds to the internal pressure of said container regardless of fluid flow rate;
   first cycling valve means with fluid couplings to said first port means and said second port means operative upon actuation thereof to by-pass the pilot valve to permit fluid to flow into said second chamber from said first fluid coupling means to actuate the diaphragm valve; and second cycling valve means with fluid couplings to said second port means and to said second fluid coupling means operative upon actuation thereof to permit fluid to flow from said second chamber into said second fluid coupling means to de-actuate the diaphragm valve.

References Cited in the file of this patent

UNITED STATES PATENTS

| | | |
|---|---|---|
| 784,408 | Krichbaum | Mar. 7, 1905 |
| 2,676,611 | Page | Apr. 27, 1954 |
| 2,837,241 | Griswold | June 3, 1958 |
| 3,013,432 | O'Keeffe | Dec. 19, 1961 |

FOREIGN PATENTS

| | | |
|---|---|---|
| 506 | Great Britain | Jan. 12, 1886 |